United States Patent
Jordan et al.

(10) Patent No.: US 11,140,457 B1
(45) Date of Patent: Oct. 5, 2021

(54) NETWORK ROUTING SELECTIONS FOR WIRELESS DEVICES

(71) Applicant: Amazon Technologies, Inc., Seattle, WA (US)

(72) Inventors: Barry Dean Jordan, Austin, TX (US); QingYun Wei, San Jose, CA (US); Timothy Thompson, Leander, TX (US); Graham LeBlanc, Round Rock, TX (US); David James Roberts, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 16/137,450

(22) Filed: Sep. 20, 2018

(51) Int. Cl.
| | |
|---|---|
| *H04N 21/647* | (2011.01) |
| *H04N 21/4147* | (2011.01) |
| *H04W 76/15* | (2018.01) |
| *H04N 21/41* | (2011.01) |
| *H04W 84/12* | (2009.01) |

(52) U.S. Cl.
CPC ... *H04N 21/64738* (2013.01); *H04N 21/4126* (2013.01); *H04N 21/4147* (2013.01); *H04N 21/64707* (2013.01); *H04W 76/15* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 9,413,436 B2 * | 8/2016 | Cho | H04W 40/22 |
| 10,064,184 B1 * | 8/2018 | Jorgovanovic | H04B 17/318 |
| 10,305,951 B1 * | 5/2019 | Jorgovanovic | H04L 65/4084 |
| 10,412,746 B2 * | 9/2019 | Taghavi Nasrabadi | |
| | | | H04W 24/10 |
| 2005/0036469 A1 * | 2/2005 | Wentink | H04B 7/2126 |
| | | | 370/338 |
| 2005/0138178 A1 * | 2/2005 | Wentink | H04Q 7/24 |
| | | | 370/338 |
| 2005/0107102 A1 * | 5/2005 | Yoon | H04W 74/00 |
| | | | 455/466 |
| 2005/0157668 A1 * | 7/2005 | Sivan | G08C 17/02 |
| | | | 370/312 |

(Continued)

*Primary Examiner* — Ricky Chin
(74) *Attorney, Agent, or Firm* — Eversheds Sutherland (US) LLP

(57) ABSTRACT

Devices and methods are provided for determining and establishing network path for a streaming video device. The device may receive video from a remote digital video recorder (DVR) through a first access point (AP) wirelessly connected to second AP of the remote DVR, wherein the streaming video device, the first AP, and the remote DVR share a network, wherein the remote DVR includes a third AP. The device may determine a first connection quality associated with a first frequency band between the streaming video device and the first AP. The device may determine a second connection quality associated with a second frequency band between the streaming video device and the second AP. The device may determine that the second connection quality exceeds the first connection quality. The device may establish a direct connection between the streaming video device and the second AP using second frequency band. The device may receive DVR video over the second frequency band.

20 Claims, 7 Drawing Sheets

(56) References Cited

U.S. PATENT DOCUMENTS

| | | | |
|---|---|---|---|
| 2006/0193292 A1* | 8/2006 | Bansal | H04W 76/14 370/331 |
| 2009/0168689 A1* | 7/2009 | Itagaki | H04W 72/085 370/315 |
| 2014/0053213 A1* | 2/2014 | Ueda | H04N 21/43637 725/60 |
| 2014/0181880 A1* | 6/2014 | Chen | H04W 4/06 725/110 |
| 2014/0254349 A1* | 9/2014 | Jia | H04L 1/1835 370/225 |
| 2015/0117247 A1* | 4/2015 | Wang | H04W 24/08 370/252 |
| 2017/0006117 A1* | 1/2017 | Kafle | H04B 17/318 |
| 2017/0041685 A1* | 2/2017 | Kwon | H04N 21/4751 |
| 2018/0176879 A1* | 6/2018 | Yoon | H04W 64/003 |
| 2019/0014373 A1* | 1/2019 | Shin | H04N 21/4825 |
| 2021/0022037 A1* | 1/2021 | Bhutani | H04W 28/04 |

\* cited by examiner

NETWORK ROUTING SELECTIONS FOR WIRELESS DEVICES

BACKGROUND

Streaming video devices may receive video from a variety of sources, including video providers separate from the streaming video devices. Using wireless connections, a streaming video device may connect to a video provider through an access point. Streaming video devices may change wireless connections if another wireless connection is available and if the other wireless connection may allow for better streaming and playback of video. Changing wireless connections may take time, resulting in delayed downloading and playback of streaming video, and remote control signals which may not be received by a streaming video device during a change of wireless connections.

Figure 1:
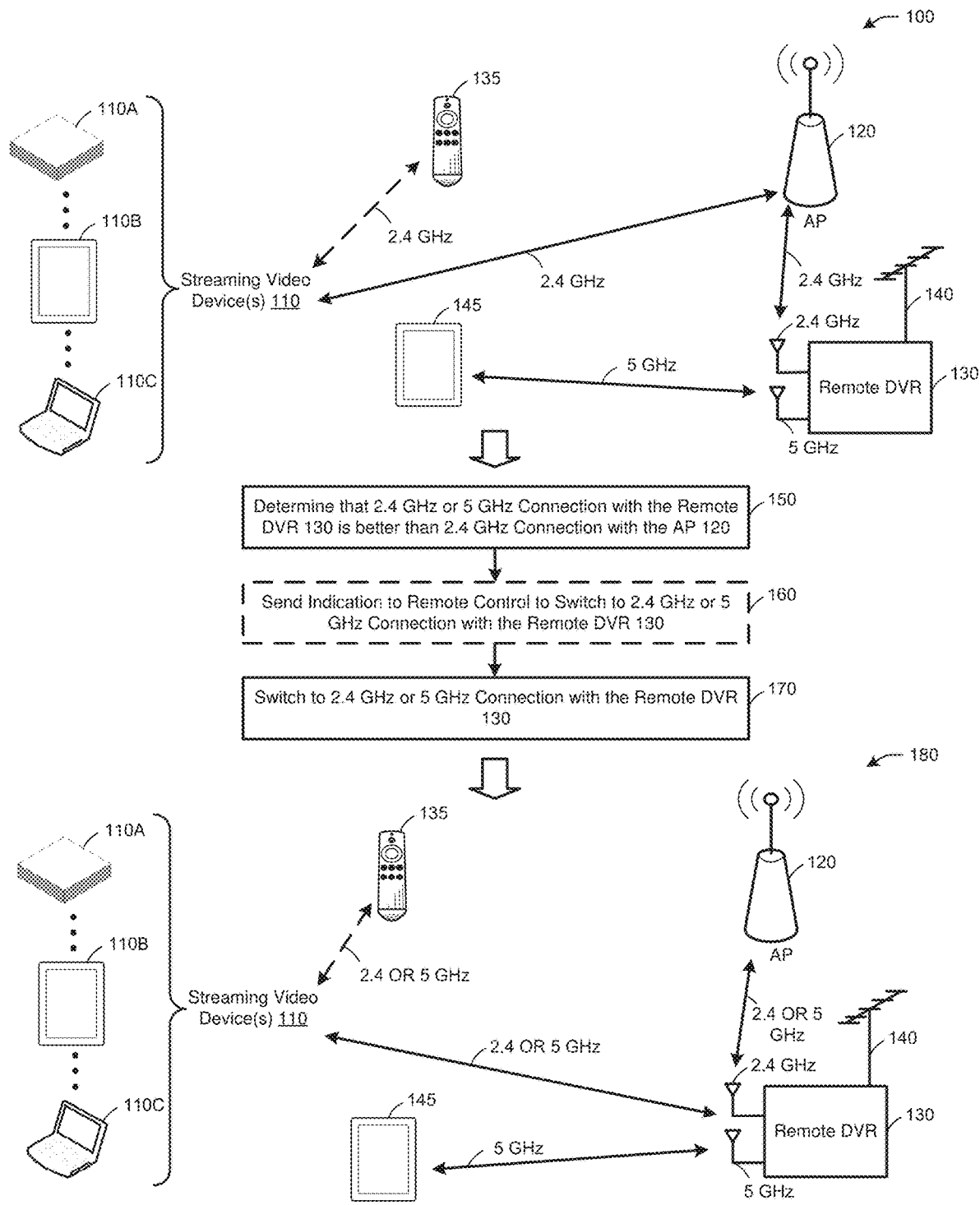
FIG. 1 illustrates an example process of changing from a first wireless configuration 100 to a second wireless configuration for a streaming video device, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for determining network routes for streaming video. Streaming video devices may access content provided by one or more remote servers. Remote servers may include digital video recorders (DVRs) or other devices on which video content may be stored for playback. For example, a streaming device may have limited memory which may be supplemented by the use of remote DVRs which may allow users to access content on-demand. To connect a streaming video device to a remote DVR, a wireless connection may be established between the streaming video device and a local wireless access point (AP), and the AP may use an area network to access a remote DVR. Content stored on the DVR device may be streamed to the AP, and from the AP to the streaming video device.

Multiple wireless connections may be available to connect a streaming video device to a remote DVR. Not only may a streaming video device access a DVR device through a local access point, but also the streaming video device may connect directly to an AP of a remote DVR. For example, if a channel (e.g., wireless connection) on a home AP becomes congested, a streaming video device connected to the congested channel may disconnect from the channel and connect directly to a less congested channel provided by an AP of the remote DVR.

The DVR device or other video provider device may include multiple APs, which may provide multiple available bandwidths available for connections with home APs and streaming video devices. For example, the video provider device may include a 2.4 GHz frequency bandwidth and a 5 GHz frequency bandwidth to support multiple video content streams (e.g., for 1080p video) to multiple streaming video devices over Wi-Fi. A streaming video device may change networks (e.g., from a local AP to a video provider device AP) when a clear benefit is identified (e.g., less congestion).

To allow streaming video devices to quickly change connections from a local AP to a video provider device AP (or vice versa), the streaming video device may limit the Wi-Fi frequency/channel to a single frequency/channel. When wireless devices look for available wireless connections/networks, the devices may use a probe request and probe response exchange to identify nearby APs. If a probe response from an AP indicates a wireless network that is compatible with the requesting streaming device, then the wireless device may send an authentication request to the AP in order to be authenticated by the AP, and the AP may respond with an authentication response. The streaming device may want to associate with a particular AP identified as being compatible, so the streaming device may send an association request to the desired AP, and the AP may associate the streaming device and send an association response. After the streaming device is associated with an AP, the streaming device may exchange data with the AP.

A frequency band supported by an AP may include multiple channels which may be used to connect the AP to multiple devices such as a streaming video device. For example, a 5 GHz frequency band may include more channels than a 2.4 GHz frequency band. The streaming video device may select from available channels in a frequency band by measuring the activity in those channels. By limiting the channels to particular frequency bands of one or more APs (e.g., channels of frequency bands of a local AP and remote AP sharing a sub-network), the streaming video device may quickly identify an available channel to which to switch.

Because a streaming video device, home AP, and video provider device AP may be on a same network and subnetwork, an Internet Protocol (IP) address of the streaming video device may be maintained even when the streaming video device changes network connections. Because the IP address may be used to establish a device connection in a particular channel, maintaining the streaming video device's IP address may allow for faster and less noticeable network transitions between existing home AP networks and video provider device AP Wi-Fi networks without a user of the streaming video device or playback application of the streaming video device having to perform any tasks other than the device enabling a service which facilitates the process. The streaming video device may switch between connections on the same subnetwork using the same IP address. This way, for example, if a user selects video content for playback using the video streaming device, the video streaming device may switch to a better wireless network to facilitate playback without a noticeable delay.

Rather than connecting to an available home AP network and being subject to that network, the streaming video device may have the ability to search for a better network at any given time, including when a user selects video content for playback. The streaming video device may use logic to identify networks with better conditions than a current network, such as when a video provider device AP provides better networks than a home AP which connects to the video provider device AP. By allowing a streaming video device to identify and select networks with improved conditions, a user's experience with the streaming video device may be improved by allowing for device connections which are better configured to provide continuous video playback. To determine whether a connection is better than another connection may include determining that one connection fails to satisfy a threshold (e.g., a threshold measure of congestion, throughput, and/or signal strength), and that another connection satisfies the threshold.

Because Wi-Fi direct devices such as remote controls and/or controllers may connect to a streaming video device, devices connected to the streaming video device may need to change channels when the streaming video device changes channels in order to maintain communication with the streaming video device. To avoid a connected device having to scan all identified Wi-Fi channels when the streaming video device changes channels (e.g., from a home AP to a video provider device AP), which may result in lost communication for several seconds between the streaming video device and connected Wi-Fi direct (or other directly connected) device, the streaming video device may send an indication to the connected device information associated with a channel so that the connected device also may change to the channel to which the streaming video device will connect.

In one or more embodiments, a client device (e.g., a video streaming device) may be connected to a home AP on a frequency band (e.g., 2.4 GHz). The home AP may connect to an AP of a video provider device (e.g., on a 2.4 GHz band). The video provider device may also use another AP having a different frequency band (e.g., 5 GHz). If the client device determines that a direct connection with the 5 GHz frequency band or the 2.4 GHz frequency band of the video provider device would provide a better connection (e.g., based on signal strength and/or throughput), then the client device may disconnect from the local AP and connect directly to the better connection with the video provider device. When the client device is connected to the remote DRV device through the home AP, multiple "hops" may be used to provide content from the video provider device to the client device (e.g., the video provider device may need to provide content to the home AP, and the home AP may pass the content to the client device). Such an indirect connection with multiple hops may be less efficient than a direct connection between the client device and the video provider device.

In one or more embodiments, the APs of the video provider may be "soft" APs or APs. A soft AP may refer to the use of Wi-Fi chips connected to an AP, and bridged interfaces to the AP using the Wi-Fi chips, the bridged interfaces providing separate frequency bands (e.g., a 2.4 GHz band and a 5 GHz band) to which client devices (e.g., a streaming video device) may connect. A soft AP may use a single piece of hardware with two simultaneous roles. In particular, the hardware may provide AP functionality while acting as a client to an AP. The video provider may use an interface which manages multiple frequency bands such as a 2.4 GHz band and 5 GHz band, allowing client devices (e.g., streaming video devices) to switch between bands. The video provider may provide service set identifiers (SSIDs) and passwords of available connections to client devices. When a streaming video device attempts to connect with one of the frequency bands/channels of the video provider, the streaming video device may request the respective SSID and/or password of the frequency band/channel. The streaming video device may avoid having to search for other nearby APs, and instead may select available channels/wireless connections from a limited set of channels on the same subnetwork whose SSIDs are known by the streaming video device without having to disconnect from an existing connection.

In one or more embodiments, the video provider device may have multiple Wi-Fi radios (e.g., one at 2.4 GHz and one at 5 GHz). The radios may be 2×2 multiple input multiple output (MIMO) radios capable of IEEE 802.11 b/g/n standard and IEEE 802.11 a/n/ac standard communications for 2.4 GHz and 5 GHz, respectively. A smart connect algorithm executing on a client device may be able to use information determined by the client device and received from the video provider device to intelligently select and connect to any of the soft AP interfaces offered by the video provider device.

Because client devices may be designed to work with a single network interface, the video provider may toggle connections between client device and a primary radio connected to the home AP for an upstream interface. If a 2.4 GHz network is selected, then an interface may be tied to the 2.4 GHz band radio and vice versa for a 5 GHz network selection. Both radios of the video provider may be used to provide soft AP interfaces to streaming video clients for streaming of live and recorded content, but streaming video clients may be aware of only one of the radios at a time. Thus, the logic managing the multi-interface implementation of the video provider may be split between scripts in the streaming video client framework. Much of the logic may be applicable only for initial setup or under network loss conditions because those are the times when knowledge of both radios may be required. Under normal operating conditions after initial setup, the soft APs (and bridged) may facilitate streaming traffic for both radios on the video provider with the streaming client devices only interacting with the primary interface because both soft APs may be bridged to an upstream interface.

Because the video provider may be located closer to an antenna location than the streaming video device, the video provider may be connected to the home AP on a 2.4 GHz band. Thus, the scanning logic in the streaming video device may prefer 2.4 GHz networks. A Wi-Fi service for the streaming video device may scan both radios of the video provider for results. The results may be sorted and duplicates may be removed. The results may be received from the video provider in response to any queries and used to find network matches. Dual band scan results may be sorted based on received signal strength indicator (RSSI) levels and radio band with the following algorithm preferences in order of priority, for example—(1) prefer 2.4 GHz over 5 GHz; (2) prefer RSSI>=GOOD_RSSI (default: −60 dB); (3) if band and RSSI range match, compare raw RSSI levels; (4) prefer secure authentication.

Streaming video client devices may be enabled to support live streaming video from the video provider. On the streaming video client devices, there may be a connection service used to establish a network connection with the video provider. The details used to establish a network connection with the video provider may be sent to streaming video client devices in an information structure (e.g., key/value pairs), which may be sent from the video provider to the streaming video clients through a connection. The connection service may use update( ), enable( ), disable( ) and close( ) API functions. The connection service may use the connection information sent from the video provider to determine the best network connection to make from among the available options (e.g., Ethernet, Wi-Fi, 5 GHz soft AP, 2.4 GHz soft AP). The algorithm used to establish the best connection with the video provider may use an existing streaming video client network connection with a home AP, video provider congestion level-based soft AP suggestion, streaming video client Wi-Fi remote usage, and soft AP RSSI levels.

When there is an attempt to connect the streaming video device to a soft AP network on the video provider, a fast connect module may be used by the streaming video device to speed up the network connection attempt by requesting a network connection to a specific SSID at a specific frequency, an without having to notify the rest of the system of a network change. This fast connection may be possible because the same IP address is used so that there is merely a short interruption (e.g., around one second) of service during the network switch. Fast connection may require that devices not only be on the same network, but also on the same subnetwork so that all existing routing will still work when a connection is switched to a soft AP. When the streaming video client is connected to the video provider's soft AP, outgoing traffic to the internet also may be routed through the video provider soft AP connection to a bridged upstream network interface back to the home AP.

When a soft AP connection is attempted, there is a possibility of failure for various reasons including network instability, network congestion, a network not being included in a network scan list, network association rejection, and other conditions. If there is a failure to connect the streaming video client to a video provider soft AP network, the connection service may attempt to restore the original network connection. Restoring the original connection may take between 3-10 seconds approximately.

The video provider may need to be connected to the home AP either through Wi-Fi or Ethernet. Once an upstream connection is made, the soft AP connectivity may be automatically configured with matching auto-generated SSIDs and passwords for both soft APs, including proper setup of bridging between the upstream and downstream networks. The soft APs (e.g., one for 2.4 GHz and one for 5 GHz) may be configured automatically by the system. The configuration dynamically may be updated at a regular interval for improved security. Hidden soft AP SSID names and passwords may be sent securely to client devices.

In one or more embodiments, the APs of the video provider may connect to multiple home APs and/or client devices. When a client device searches for an improved connection with the APs of the video provider, the client device may be competing against other client devices and APs connected to the video provider. As such, the client device may not find a better connection at the video provider at a given time, or may find that one channel supported by a video provider AP does not offer a connection improvement, but another channel supported by a video provider AP does.

In one or more embodiments, a streaming video device may be connected to a home AP network, and the home AP may be connected to the video provider to provide video content from the video provider to the streaming video device. There may be multiple network routes between the streaming video device and the video provider: the existing route through the home AP, and a direct route from the streaming video device to the video provider. For example, if the streaming video device is on one side of a user's house, the video provider is on the other side of the house, and the home AP is in between the video provider and the streaming video device, then the home AP may provide better throughput to the streaming video device than the video provider. In an apartment environment, for example, the streaming video device, the home AP, and the video provider may be located in one room, and the congestion may be high and the throughput may be low. When congestion is high and throughput is low, the streaming video device may search for a better connection and may select a less congested channel with better throughput.

To facilitate the network path identification and selection, the video provider may identify which channel the home AP is using. For the band of the video provider that connects to the home AP, this will be trivial. For the band of the video provider that is not connected to the home AP, the video provider may search for an SSID of the same name in another band. The video provider may be on the same channel as the home AP using the same band on which the streaming video device is connected to the home AP. If the video provider is unable to find the same SSID, the video provider may search for a basic service set identifier (BSSID) on another band that is similar to the BSSID of the home AP to which the video provider is connected. If the video provider is connected over Ethernet, the video provider may receive information on a customer's home SSID in order for the video provider to find the proper channels.

In one or more embodiments, a streaming video device may initiate full-screen live or recorded video streaming on the streaming video device. For example, one or more user inputs received by the streaming video device may cause the streaming video device to initiate one or more video streams. The streaming video device may identify whether the streaming video device is connected to a home AP over a wireless or Ethernet connection. If the streaming video device is connected to a home AP over a wireless connection, the streaming video device may determine whether the wireless connection is sufficient for streaming selected video. If the streaming video device is using an Ethernet connection or a strong wireless connection, the streaming video device may remain on the home AP connection to receive video content for playback.

In one or more embodiments, if the streaming video device is not on a home AP Ethernet connection or sufficient wireless connection using the home AP, the streaming video device may determine if no Wi-Fi direct devices (e.g., remote control devices for the streaming video device) are connected to the streaming video device, or if there are matching channels offered by a video provider AP, the streaming video device may determine whether the 5 GHz connection of a DVR AP is better for video streaming. If there are Wi-Fi direct devices paired with the streaming video device or there are no matching channels offered by a video provider AP, the streaming video device may determine whether the existing connection with the home AP is on a 5 GHz band. If the streaming video device is connected to the home AP on a 5 GHz band, then the streaming video device may determine whether the 5 GHz connection with the home AP is sufficient for video streaming.

In one or more embodiments, if the 5 GHz connection of a DVR AP is better for video streaming, the streaming video device may switch connections from the home AP to the 5 GHz band of the video provider AP. If the 5 GHz connection of a DVR AP is not better for video streaming, the streaming video device may determine whether any other video provider AP connections (e.g., on a 2.4 GHz band) are better for video streaming. If so, the streaming video device may connect to a better connection on a different band offered by the video provider. If the streaming video device is using a 5 GHz connection on the home AP, the streaming video device may switch to the 5 GHz connection or another band offered by the video provider AP if any connection offered by the video provider AP offers significant improvement. Otherwise, the streaming video device may stay on an existing band of the home AP.

In one or more embodiments, if the streaming video device is connected to the home AP on a narrower band than 5 GHz (e.g., on a 2.4 GHz band), the streaming video device may determine if the 2.4 GHz band or another band of the video provider AP offers an improvement to the existing connection. If so, the streaming video device may change connections to the improved video provider AP connection. If a significant improvement would occur by switching to a direct connection with the video provider APs, then the streaming video device may remain on an existing home AP connection.

In one or more embodiments, the streaming video device may switch from a video provider AP connection to another video provider AP connection if doing so would provide a significant improvement. The streaming video device may switch from a video provider AP connection to a home AP connection. For example, if a video streaming application has access to the video provider, but another remote streaming service does not, and the remote streaming service without video provider access is selected for use on the streaming video device, then the streaming video device may leave the video provider and connect with the home AP. The streaming video device may receive selections to play content provided by a source other than the video provider, so the streaming video device may leave video provider AP connections to establish connections with the home AP.

Whether a connection is sufficient for streaming video or whether a connection is "better" than an existing connection may depend on a variety of factors. In one or more embodiments, to measure the quality of a connection and determine whether to use an existing connection or switch to a better connection, a streaming video device may consider any combination of data on the streaming video device (e.g., information about an existing connection that the streaming video device is using), measurements performed by the streaming video device (e.g., channel measurements), information received from the home AP and/or video provider, etc. For example, if a streaming video device is connected to an AP via an Ethernet connection, the streaming video device may stay on the Ethernet connection (e.g., may assume that no better connection exists). If the streaming video device is using a wireless connection, the streaming video device may measure other channels before determining whether to switch channels. The streaming video device may receive channel/band information from any AP, including video provider APs, and may use the information to identify better connections.

Congestion and throughput may be considerations for the streaming video device to determine whether to switch connections. For example, if an available channel has less congestion and/or higher throughput than an existing connection, or if an available connection has significantly less congestion and/or higher throughput (e.g., more than threshold differences when compared to a currently used channel), the streaming video device may switch to such a connection. Connections and/or interfaces for devices may be measured by quality assessment values. If the existing connection quality (e.g., assessment value) fails to satisfy a threshold for signal strength, throughput, or congestion, and an available connection quality assessment value satisfies such a threshold, the available connection may be determined to be better than the existing connection. The streaming video device may switch to a better connection to accommodate certain actions, such as a full screen viewing mode (e.g., the streaming video device may determine whether a viewing mode or condition is met before considering whether to switch connections). The streaming video device may consider whether directly connected remote devices are connected to the streaming video device, and may switch to connections compatible with the directly connected remote control device. If the streaming video device is connected to the home AP and the home AP is connected to a video provider AP, if the streaming video switches to a direct connection with the video provider, the streaming video device may prioritize switching to the channel connecting the home AP and the video provider. The channel used for a connection between the streaming video device and an AP may not matter to a device directly connected to the streaming video device using a connection other than Wi-Fi (e.g., a Bluetooth-connected remote control).

In one or more embodiments, when a transmission medium (e.g., a radio frequency channel) is shared by a video provider and a streaming video device, throughput from the streaming video device to the home AP to the video provider may be determined by:

$$\frac{1}{\frac{1}{B} + \frac{1}{C}},$$

where B is the throughput between the video provider and the home AP, and C is the throughput between the home AP and the streaming video device. This relationship is based on the air-time being shared between the two streams simultaneously. The throughput may be compared to the throughput between the video provider and the streaming video device. Whichever link has the higher estimated throughput "wins" the link decision and may be selected for a connection.

In one or more embodiments, when transmission mediums are not shared by the streaming video device and the video provider, the throughput from the video provider to the home AP to the streaming video device may be represented by: $\min(B, C)$, where B is the throughput between the video provider and the home AP, and C is the throughput between the home AP and the streaming video device. This determination may be because the 2.4G and 5G links on an AP may be dual band, dual concurrent (DBDC), same as the video provider APs, may act independently of each other, and may not interfere with each other's airtime. The throughput may be compared to the direct-connection on the r video provider AP's 2.4G link. The link with the higher estimated throughput may be selected for a connection.

In one or more embodiments, when a medium is shared, the congestion value may not be relevant because the congestion is the same for the devices sharing the medium. In an unshared medium, however, congestion may be considered. For example, if the home AP connection to the video provider is 2.4 GHz and the home AP connection to the streaming video device is 5 GHz: B*(100%−congestion %)=B* and throughput may be represented by $$\frac{1}{\frac{1}{B} + \frac{1}{C}},$$

where B* is the throughput between the video provider and the home AP adjusted for congestion, and C is the throughput between the home AP and the streaming video device. This way, the proper congestion on an impacted link (e.g., link B) can be used to calculate the viability of that link. However, fast-congestion measurements may report inaccurate numbers because congestion may spike randomly based on a number of other APs in an area, a number of clients connected to the same AP, and/or a number of devices operating in the same band on other technologies (e.g., Bluetooth, Bluetooth Low Energy, Zigbee, etc.). Longer time-averages may be required to achieve accurate congestion measurements. For streaming video, a standard measurement metric may be 30 second time-averaged samples, and may use many of such samples.

In one or more embodiments, to facilitate a channel change (e.g., from a channel of a home AP to a channel of a video provider AP), the streaming video device may send a frame to a Wi-Fi direct device (e.g., a remote control) to indicate the new channel so that the streaming video device along with the Wi-Fi direct device may switch to the new channel. This communication with a Wi-Fi connected device may accelerate a channel switch while avoiding time needed for a remote control device to find the new channel for the streaming video device and avoiding lost communications between the remote control device and the streaming video device after the streaming video device has switched channels and before the remote control device also has switched to the new channel.

In one or more embodiments, a variety of preferences may control a decision process by a video streaming device to determine whether to switch from one connection to another, and which connection to use. For example, one priority may be to avoid losing connection with a connected remote control device, so if the remote control device is connected to the streaming video device using Wi-Fi direct, the streaming video device may attempt to connect to the same video provider channel as is being used when the streaming video device is connected to the video provider through a home AP. However, ifusing a connection which may provide the easiest switch for a connected Wi-Fi remote control may result in having to use a connection which is too far away or is too congested, then a different connection may be used. This way, video streaming user experience may not be sacrificed simply to facilitate an easier connection change for a remote control.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process of changing from a first wireless configuration 100 to a second wireless configuration 180 for a streaming video device, in accordance with one or more example embodiments of the present disclosure.

Referring to FIG. 1, the process 100 may include one or more streaming video devices 110 (e.g., streaming video device 110A, streaming video device 110B, . . . , streaming video device 110N) which may be connected to an access point (AP) 120. The AP 120 may connect to a remote DVR 130, which may be a wireless DVR or another type of device used to store and provide streaming video to the one or more streaming video devices 110 through the AP 120. The one or more streaming video devices 110 may be connected to the AP 120 using a 2.4 GHz band connection, and the AP 120 may connect to the remote DVR 130 using a 2.4 GHz band connection. The remote DVR 130 may include an antenna 140 to receive wireless signals (e.g., video content). The antenna 140 may be an over-the-air antenna or another type of antenna. A remote control device 135 may connect wirelessly to the one or more streaming video devices 110 (e.g., using Wi-Fi direct, Bluetooth, etc.). Shown in FIG. 1, the remote control device 135 may be connected to the one or more streaming video devices using a Wi-Fi connection with a 2.4 GHz band, but the Wi-Fi connection in the process 100 also may be a 5 GHz connection with the AP 120. A streaming video device 145 may be connected to the remote DVR 130 using a 5 GHz connection of an AP of the remote DVR 130, and the process 100 may allow the streaming video device 145 to use a 2.4 GHz connection with the remote DVR 130.

At step 150, the streaming video device 110A may determine that a direct 2.4 GHz or direct 5 GHz connection with the remote DVR 130 is better than the existing 2.4 GHz connection between the streaming video device 110A and the AP 120. For example, the wireless signal strength between the streaming video device 110A and the remote DVR 130 over a direct 2.4 GHz connection (e.g., bypassing the AP 120) or direct 5 GHz connection (e.g., such as the connection used by the streaming video device 145) may be stronger than the signal strength between the streaming video device 110A and the AP 120. The stronger signal may provide a better connection than the existing connection to the AP 120 to allow the streaming video device 110A to download streaming video from the remote DVR 130. Whether a connection is better may be based on signal strength, throughput, and/or wireless channel congestion. The existing connection may be measured against a threshold for signal strength, throughput, and/or congestion, and may be found to fail the threshold. If another available connection (e.g., a direct connection with the remote DVR 130) satisfies the threshold, then the other available connection may be considered better than the existing connection. The determination of whether another connection is better than the existing connection may be at least partially triggered by a determination that the quality of the existing connection has failed to satisfy a threshold or certain quality criteria.

At step 160, because the remote control device 135 may be connected to the streaming video device 110A, the streaming video device 110A may send an indication of the direct connection (e.g., a band, channel, and identifier of the remote DVR 130) to the remote control device 135 to indicate to the remote control device 135 that the streaming video device 110A is switching wireless connections to the 2.4 GHz or 5 GHz direct connection with the remote DVR 130. The notice provided to the remote control device 135 may allow the remote control device 135 to quickly find and establish the new connection so that the remote control device 135 does not send signals to the streaming video device 110A on the old connection after the streaming video device 110A has left that connection. This way, command signals from the remote control device 135 to the streaming video device 110A may be received rather than missed. It is not required that the remote control device 135 be present or connected to the streaming video device 110A, in which case step 160 may be skipped.

At step 170, the streaming video device 110A may switch to the 2.4 GHz direct or 5 GHz direct connection with the remote DVR 130. As shown in FIG. 1, the wireless configuration 108 includes the direct connection with the remote DVR 130 bypassing the AP 120, and the AP 120 may remain connected to the remote DVR 130 even though the streaming video device 110A has disconnected from the AP 120. The streaming video device 110A, the remote DVR 130, and the AP 120 may be located on a shared sub-network so that information may be used in establishing wireless connections may be shared. For example, an IP address of the streaming video device 110A may be known to both the AP 120 and the remote DVR 130 regardless of whether the streaming video device 110A is connected directly to the remote DVR 130 or is connected to the remote DVR 130 through the AP 120. Because the remote DVR 130 may know the IP address of the streaming video device 110A when the streaming video device 110A attempts to establish a direct connection with the remote DVR 130, the establishment of the direction connection may be faster than if the IP address of the streaming video device 110A had to be established. The reverse also may be true in that the streaming video device 110A may disconnect from a direct connection with the remote DVR and 130 return to a connection with the AP 120. The AP 120 may remain connected to the remote DVR 130 on the same network/sub-network, allowing faster reconnection with the AP 120 if the streaming video device 110 switches back to a connection with the AP 120, and allowing other devices (e.g., the client device 145) to connect to the remote DVR 130 through the AP 120.

The AP 120 may be a home AP (e.g., in a house or apartment). The remote DVR 130 may be in a home or apartment, or may be more remote from a house or apartment where the streaming video device 110A may be used. When the streaming video device 110A is commanded to access streaming video provided by the remote DVR 130, the streaming video device 110A may determine the best network route (e.g., connection) with the remote DVR 130, either through the AP 120 or via a direct connection with the remote DVR 130. The remote DVR 130 may provide multiple wireless channels on different frequency bands (e.g., 2.4 GHz and 5 GHz). An interface may allow the remote DVR 130 to provide the different bands and allow devices to switch seamlessly between different connections provided by the remote DVR 130 as explained further below.

Figure 2:
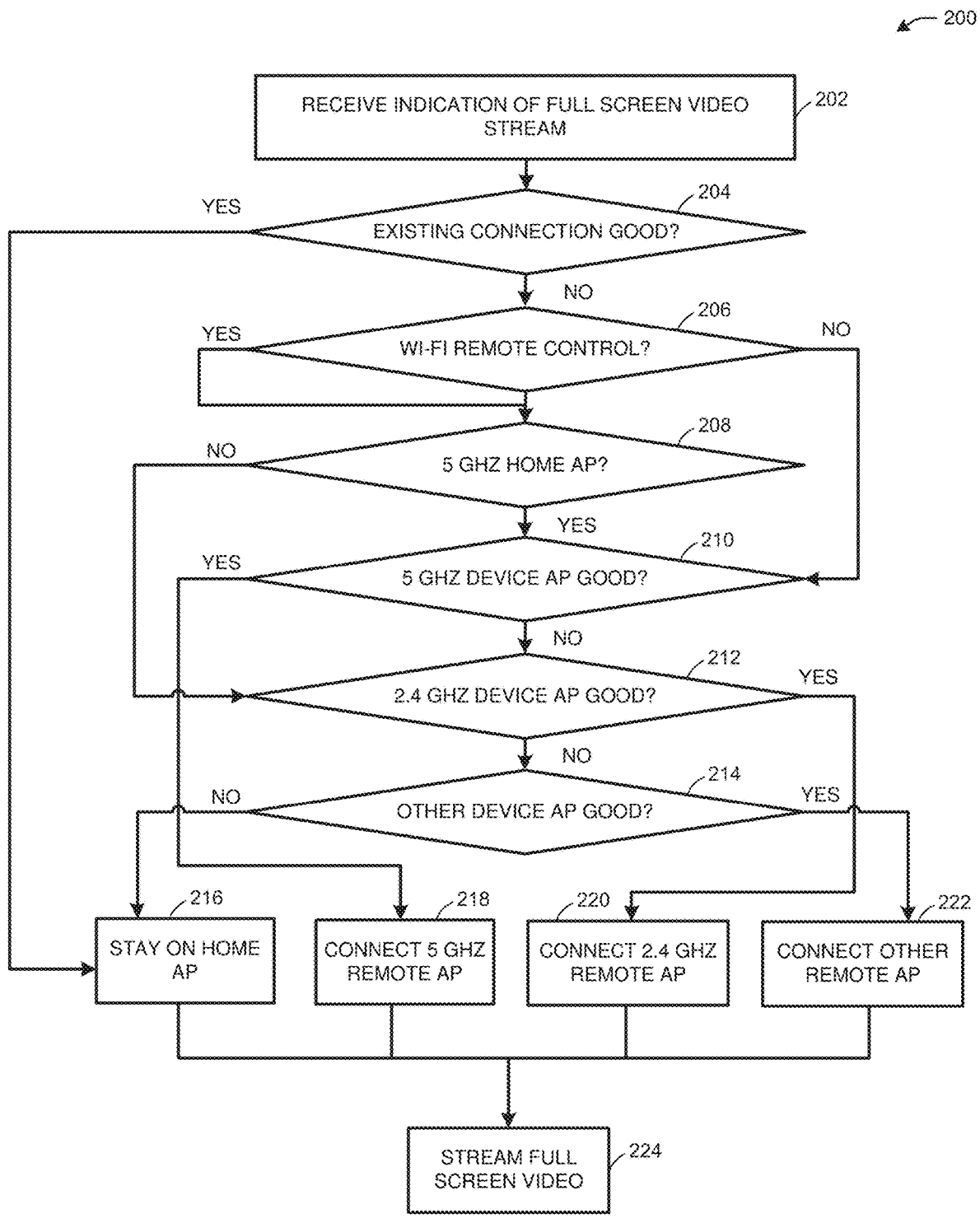
FIG. 2 illustrates a process for establishing a network route for a streaming video device, in accordance with one or more example embodiments of the present disclosure.

FIG. 2 illustrates a process 200 for establishing a network route for a streaming video device, in accordance with one or more example embodiments of the present disclosure.

At block 202, one or more processors of a device (e.g., the streaming video device 110A of FIG. 1) may receive an indication of a full-screen video stream of portions of digital content (e.g., streaming video content). For example, one or more inputs received from a remote control device (e.g., the remote control device 135 of FIG. 1) may command the device to cause full-screen playback of selected video content. A remote control device which may provide command signals to the device may be connected wirelessly (e.g., through Wi-Fi, Bluetooth, Zigbee, etc.). The command to play video may correspond to receiving streaming video from a remote DVR (e.g., remote DVR 130 of FIG. 1) or from another type of device which may store and provide video content.

At block 204, the one or more processors of the device may determine whether the existing connection used by the device to receive streaming video is a good connection. The existing connection may be an Ethernet connection through a home AP (e.g., AP 120 of FIG. 1), a wireless connection through an home AP, or a wireless connection through a remote AP (e.g., remote DVR 130 of FIG. 1). Whether a connection is good may depend on the signal strength, throughput, and/or channel congestion. If the signal strength, throughput, and/or congestion satisfy one or more thresholds indicative of the signal strength, throughput, and/or congestion, the existing connection may be considered a good connection. Otherwise, if the existing connection fails to satisfy a respective threshold, the existing connection may not be considered a good connection. If the connection is an Ethernet connection through a home AP, the device may stay on the existing connection with the home AP at block 216 to receive streaming video in a full-screen mode at block 224. If the existing connection is a wireless connection through a home AP, the process 200 may continue at block 206.

At block 206, the one or more processors of the device may determine whether any Wi-Fi direct devices (e.g., a remote control device) is paired with the device or whether there are any soft AP channels (e.g., from the remote DVR 130 of FIG. 1) which match the existing connection between the device and the home AP. For example, if the existing connection with the home AP is a 2.4 GHz connection, the device may search for an available 2.4 GHz connection with a remote DVR (e.g., a different AP) before searching for available connections using another bandwidth. If there are no Wi-Fi direct remote control devices paired with the device and there are no matching soft AP channels available at the remote DVR, the process may continue to block 208. If there are any Wi-Fi direct-paired devices matching soft AP channels available at the remote DVR, the process may continue to block 210.

At block 208, the one or more processors of the device may determine whether it is connected to the home AP on a 5 GHz channel. If yes, the process 200 may continue at block 210. If no, the process 200 may continue to block 212. If a remote control device is paired using Wi-Fi, the frequency band used for the existing connection may take priority when searching for another available connection at another AP. For example, if the existing connection uses 5 GHz, then the device may consider the connection quality of a 5 GHz connection with another AP before considering a different frequency band on the network.

At block 210, the one or more processors of the device may determine whether a direct 5 GHz connection with the remote DVR (e.g., a device AP) is good for streaming video from the remote DVR. Whether the connection is good may depend on signal strength, throughput, and/or congestion. If the connection has a weak signal, the channel is congested, and/or the throughput is low, then the device may determine that the direct 5 GHz connection with the remote DVR is not good, and may continue to block 212. If the direct 5 GHz connection is good, the process 200 may continue to block 218, where the device may establish a direct connection with the remote DVR using a 5 GHz channel provided by the remote DVR, and at block 224 may stream full-screen video over the direct 5 GHz connection with the remote DVR. Determining whether the connection is good may include comparing signal strength, throughput, and/or congestion with the existing connection. If the direct connection has higher throughput, stronger signal strength, and/or less congestion than the existing connection, the device may switch to the direct connection.

At block 212, the one or more processors of the device may determine whether a direct 2.4 GHz connection with the remote DVR is good for streaming video from the remote DVR. Whether the connection is good may depend on signal strength, throughput, and/or congestion. If the connection has a weak signal, the channel is congested, and/or the throughput is low, then the device may determine that the direct 2.4 GHz connection with the remote DVR is not good, and may continue to block 214. If the direct 2.4 GHz connection is good, the process 200 may continue to block 220, where the device may establish a direct connection with the remote DVR using a 2.4 GHz channel provided by the remote DVR, and at block 224 may stream full-screen video over the direct 2.4 GHz connection with the remote DVR. If the direct connection has higher throughput, stronger signal strength, and/or less congestion than the existing connection, the device may switch to the direct connection.

At block 214, the one or more processors of the device may determine if any other direct connections with the remote DVR (e.g., device AP) are better than the existing connection with the home AP. If not, the process 200 may continue to block 216 where the device may stay on the existing connection with the home AP. If another direct connection with the remote DVR is better than the existing connection with the home AP, then the process 200 may continue to block 222, where the device may connect to the other direct connection, and then at block 224 may receive streaming video over the direct connection.

To determine connection quality, the device may measure connections by measuring signal strength, performing channel quality assessments, and receiving data from home and remote APs regarding available connections and the respective throughput, congestion, etc. The device may compare channel information in different bands to identify whether a connection is better than the existing connection used by the device at a given time. The determination of whether another channel is better than an existing channel connection may be triggered by a selection of video or any user input, or may be periodic.

Whether a connection is sufficient for streaming video or whether a connection is "better" than an existing connection may depend on a variety of factors. In one or more embodiments, to measure the quality of a connection and determine whether to use an existing connection or switch to a better connection, a streaming video device may consider any combination of data on the streaming video device (e.g., information about an existing connection that the streaming video device is using), measurements performed by the streaming video device (e.g., channel measurements), information received from the home AP and/or remote DVR, etc. For example, if a streaming video device is connected to an AP via an Ethernet connection, the streaming video device may stay on the Ethernet connection (e.g., may assume that no better connection exists). If the streaming video device is using a wireless connection, the streaming video device may measure other channels before determining whether to switch channels. The streaming video device may receive channel/band information from any AP, including remote DVR APs, and may use the information to identify better connections.

Congestion and throughput may be considerations for the streaming video device to determine whether to switch connections. For example, if an available channel has significantly less congestion and/or higher throughput (e.g., more than threshold differences when compared to a currently used channel), the streaming video device may switch to such a connection. The streaming video device may switch to a better connection to accommodate certain actions, such as a full screen viewing mode (e.g., the streaming video device may determine whether a viewing mode or condition is met before considering whether to switch connections). The streaming video device may consider whether directly connected remote devices are connected to the streaming video device, and may switch to connections compatible with the directly connected remote control device. If the streaming video device is connected to the home AP and the home AP is connected to a remote DVR AP, if the streaming video switches to a direct connection with the remote DVR, the streaming video device may prioritize switching to the channel connecting the home AP and the remote DVR. The channel used for a connection between the streaming video device and an AP may not matter to a device directly connected to the streaming video device using a connection other than Wi-Fi (e.g., a Bluetooth-connected remote control).

In one or more embodiments, when a transmission medium (e.g., a radio frequency channel) is shared by a remote DVR and a streaming video device, throughput from the streaming video device to the home AP to the remote DVR may be determined by:

$$\frac{1}{\frac{1}{B}+\frac{1}{C}},$$

where B is the throughput between the remote DVR and the home AP, and C is the throughput between the home AP and the streaming video device. This relationship is based on the air-time being shared between the two streams simultaneously. The throughput may be compared to the throughput between the remote DVR and the streaming video device. Whichever link has the higher estimated throughput "wins" the link decision and may be selected for a connection.

In one or more embodiments, when transmission mediums are not shared by the streaming video device and the remote DVR, the throughput from the remote DVR to the home AP to the streaming video device may be represented by: min(B, C), where B is the throughput between the remote DVR and the home AP, and C is the throughput between the home AP and the streaming video device. This determination may be because the 2.4G and 5G links on an AP may be dual band, dual concurrent (DBDC), same as the remote DVR APs, may act independently of each other, and may not interfere with each other's airtime. The throughput may be compared to the direct-connection on the remote DVR AP's 2.4G link. The link with the higher estimated throughput may be selected for a connection.

In one or more embodiments, when a medium is shared, the congestion value may not be relevant because the congestion is the same for the devices sharing the medium. In an unshared medium, however, congestion may be considered. For example, if the home AP connection to the remote DVR is 2.4 GHz and the home AP connection to the streaming video device is 5 GHz: B*(100%−congestion %)=B* and throughput may be represented by $$\frac{1}{\frac{1}{B^*} + \frac{1}{C}},$$

where B* is the throughput between the remote DVR and the home AP adjusted for congestion, and C is the throughput between the home AP and the streaming video device. This way, the proper congestion on an impacted link (e.g., link B) can be used to calculate the viability of that link. However, fast-congestion measurements may report inaccurate numbers because congestion may spike randomly based on a number of other APs in an area, a number of clients connected to the same AP, and/or a number of devices operating in the same band on other technologies (e.g., Bluetooth, Bluetooth Low Energy, Zigbee, etc.). Longer time-averages may be required to achieve accurate congestion measurements. For streaming video, a standard measurement metric may be 30 second time-averaged samples, and may use many of such samples.

Because the IP address of the device may be known to APs on the same network/subnetwork, and because the SSIDs of the AP connections on the same network/subnetwork, the establishment of a connection may include the device sending a request to an AP to join a network with an SSID. The AP, knowing the IP address of the device, may facilitate the establishment of a connection with the device without requiring an IP-layer establishment.

The device may switch between connections with a home AP and a remote DVR. For example, if the device connects to the remote DVR to receive video content from the remote DVR, but later wants to receive video content from another source, the device may switch back to a connection with the AP to receive video content from the other source through the AP. The connection with the remote DVR later may be worse than the connection with the AP or than another connection with a different AP of the remote DVR. The device may switch to a better AP connection at the remote DVR, or may switch back to a connection with the AP if such a connection would offer an improvement to the existing connection to a remote DVR AP.

Figure 3:
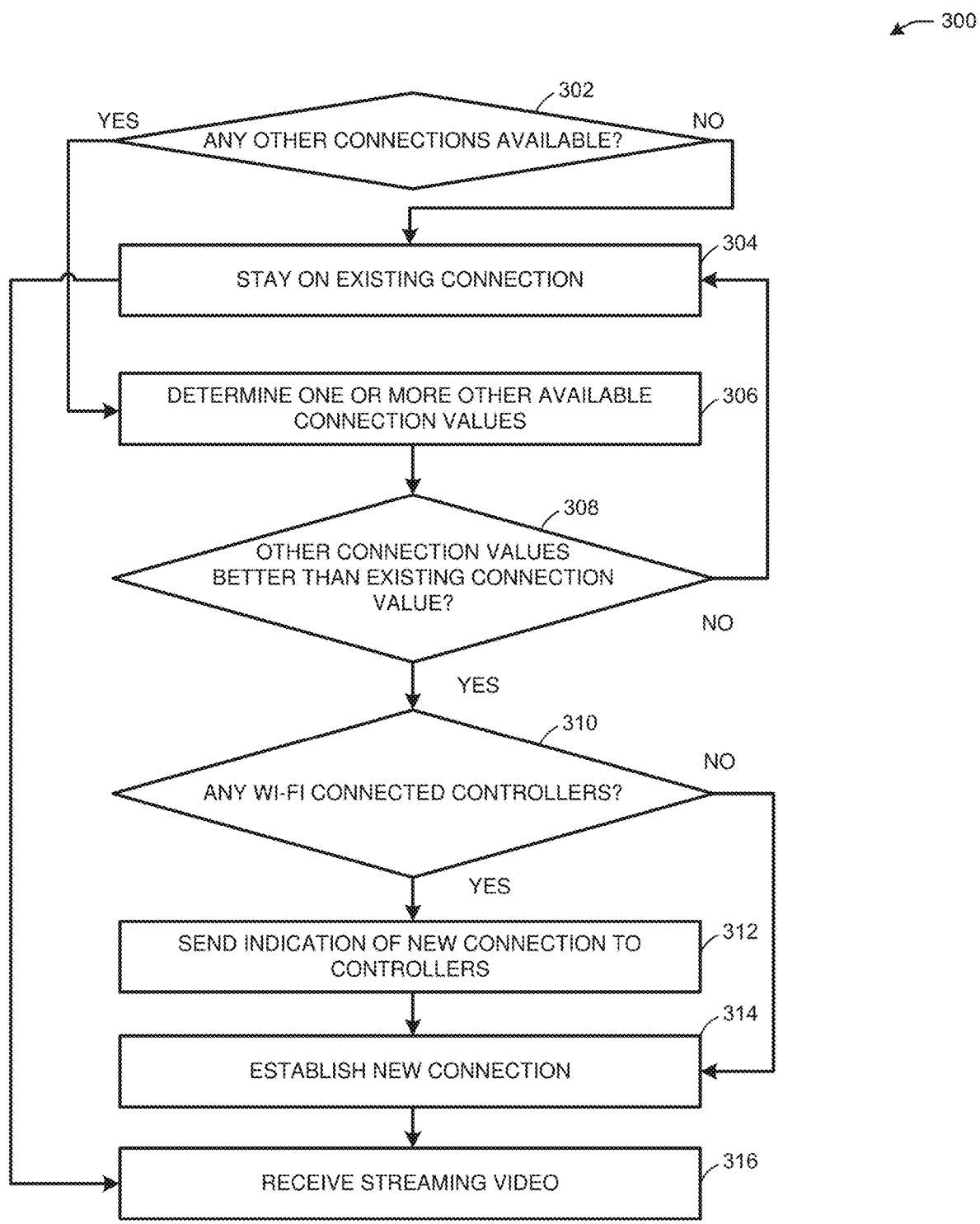
FIG. 3 illustrates a flow diagram for a process for establishing a network route for a streaming video device, in accordance with one or more example embodiments of the present disclosure.

FIG. 3 illustrates a flow diagram for a process 300 for establishing a network route for a streaming video device, in accordance with one or more example embodiments of the present disclosure.

At block 302, processing circuitry of a device (e.g., the streaming video device 110A of FIG. 1) may determine whether any wireless connections other than an existing connection used by the device are available. The existing connection may be with one AP (e.g., the AP 120 of FIG. 1), and other existing connections may be with one or more other APs. To determine whether other AP connections are available, the device may receive indications of the available connections from the AP with which the device is connected. For example, the AP connected to the device also may be connected to one or more other APs, such as APs on a remote DVR (e.g., remote DVR 130 of FIG. 1) or another device AP. The remote DVR APs may provide content to the AP, which may relay the content to the device. However, the device may be able to connect to the remote DVR using a remote DVR AP, thereby bypassing the AP to which the device is already connected. The device, the AP, and the other APs may share a network/subnetwork, and the other APs may send information such as SSIDs of available connections and respective channel/band quality/assessment value of connections provided by the other APs. If there are no other available wireless connections, then the device may, at block 304, stay on the existing connection with the AP, and may receive streaming video using the existing connection at block 316. If there are other available connections with another AP, however, the process 300 may continue to block 306.

At block 306, the processing circuitry of the device may determine the connection qualities/assessment values associated with the one or more other available connections. The device may receive indications of the connection qualities from an AP. For example, if the other connections are associated with a second AP connected to the AP on the same subnetwork, the second AP may send channel connection information to the AP, which may send the channel connection information to the device. The device may determine the channel qualities/assessment values of available channels on the second AP (or any other AP) by identifying channel congestion, channel throughput, signal strength, etc. The device may measure the existing channel quality/assessment value by measuring signal strength or receiving indications of signal strength, congestion, and/or throughput of the connection being used with the AP. If the device is using a good connection (e.g., Ethernet or a wireless connection with an assessment value satisfying a corresponding range/threshold), the device may stay on the existing connection, otherwise the device may consider connection assessment values of other connections/devices (e.g., APs). If the device is using a channel in a 2.4 GHz band with the AP, at block 308, the device may consider first whether a channel in a 2.4 GHz band with the second AP would provide a better connection. If the device is using a channel in a 5 GHz band with the AP, the device may consider first whether a channel in a 5 GHz band with the second AP would provide a better connection. The device may prioritize available channels based on the existing channel/frequency bandwidth and/or based on whether a remote control device is paired with the device using a Wi-Fi connection. If no available connections with another AP are better than an existing connection with the AP, then the process 300 may return to block 304, staying on the existing connection. If a better connection is identified with another AP, the process 300 may continue to block 310.

At block 310, the processing circuitry of the device may determine whether any controllers (e.g., remote control device 135 of FIG. 1) are paired with the device using a Wi-Fi connection (e.g., Wi-Fi direct). If no remote control devices are paired or if the pairing does not use a Wi-Fi connection (e.g., if the pairing uses Bluetooth), the process 300 may continue to block 314. If a paired remote control uses a Wi-Fi connection, however, the process 300 may continue to block 312.

At block 312, the processing circuitry of the device may send an indication of the selected new connection to any paired remote controller. For example, to avoid switching connections without paired remote control devices knowing of the switch, thereby risking a disconnect between the paired remote control and the device, the device may indicate to the remote control which connection will be used before establishing the new connection. The indication may include the SSID or another identifier of the AP providing the new connection, along with information regarding a particular frequency bandwidth or channel. This way, paired remote control devices may establish connections on the new channel without losing communication with the device for a significant period of time.

At block 314, the processing circuitry of the device may establish the new connection with the connection identified as being better than the existing connection. Establishing the connection may include sending a request with an indication of the SSID or another identifier for the requested connection. The request may be sent to the AP with which the device is already connected, and relayed to the AP to which the device is requesting a new connection. The new AP may receive the request and send a response to the device confirming the new connection on a particular channel in a frequency band.

At block 316, the processing circuitry of the device may receive streaming video (e.g., portion of digital content) from the newly connected AP over the new connection. The device may disconnect from the first AP, but the first AP may remain connected to the newly connected AP on the same subnetwork to allow the device to switch back to a connection with the first AP.

Figure 4:
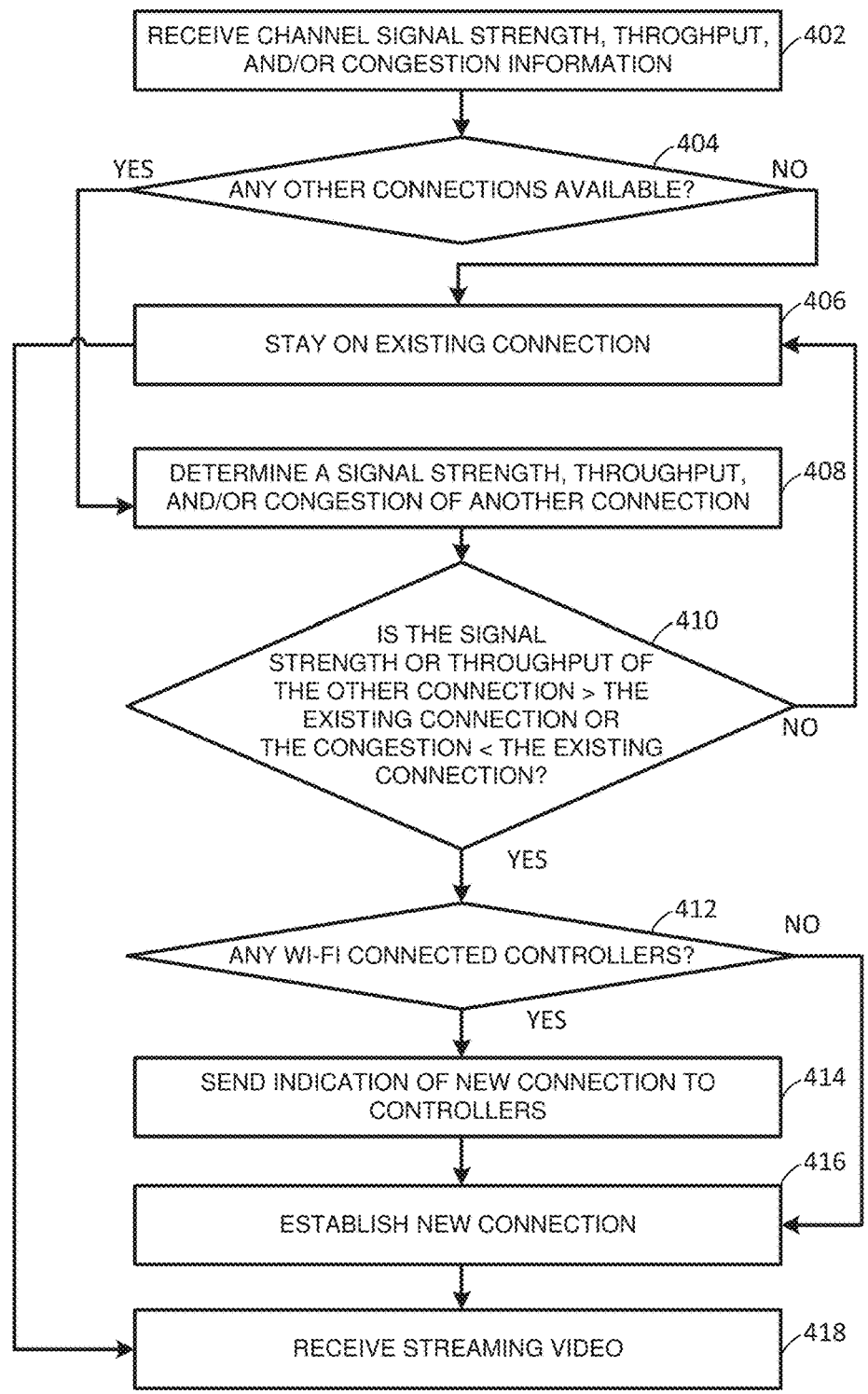
FIG. 4 illustrates a flow diagram for a process for establishing a network route for a streaming video device, in accordance with one or more example embodiments of the present disclosure.

FIG. 4 illustrates a flow diagram for a process 400 for establishing a network route for a streaming video device, in accordance with one or more example embodiments of the present disclosure.

At block 402, processing circuitry of a device, (e.g., the streaming video device 110A of FIG. 1) may receive information/connection data regarding available connections with one or more APs. For example, the device may be connected to an AP (e.g., AP 120 of FIG. 1), and other APs (e.g., associated with the remote DVR 130 of FIG. 1 or another device AP) may provide available network connections. The AP with which the device is connected also may be connected to one or more of the other APs. The other APs may send connection data including/indicative of signal strength, congestion, and throughput for channels in multiple frequency bands to the device through the connected AP. The device may determine a quality/assessment value of the existing connection with the AP, and/or may receive indications of channel quality for the existing connection with the AP.

At block 404, the processing circuitry of the device may determine whether any other network connections are available. The received data from one or more APs may indicate the network connections which may be available, and identifiers of those networks such as SSIDs. If the device determines that no other connections are available, the process 400 may continue at block 406, where the device may remain on the existing network connection, and may proceed to block 418 where the device may receive streaming video using the existing connection. If the device determines that other connections are available with one or more other APs, the device may use the channel information to determine a signal strength, throughput, and/or congestion of respective available connections at block 408.

At block 410, the processing circuitry of the device may determine whether the signal strength, throughput, and/or congestion of a respective available connection with another AP is better than the existing connection with the connected AP. For example, if the throughput and/or signal strength of an available connection is greater than the throughput of the existing connection, or if the congestion of the available connection is less than the congestion of the existing connection, the available connection may be identified as better than the existing connection. A connection change may be made if there is any improvement, or if the improvement is significantly more than one or more threshold amounts respective to the type of measurement used to measure the quality of a connection. The device may determine whether signal strength, congestion, and/or throughput of a respective connection is above or below a threshold amount, or within an acceptable range. If so, the process 400 may continue to block 412. If not, the process 400 may return to block 406 and may stay on the existing connection.

At block 412, the processing circuitry of the device may determine if any controller devices (e.g., remote control device 135 of FIG. 1) are paired with the device, and whether the pairings use Wi-Fi connections or another type of connection. If no controller devices are paired, or if controller devices are paired using a non-Wi-Fi connection, the process 400 may continue at block 416. If a controller device is paired using a Wi-Fi direct connection, for example, the device may, at block 414, send an indication of the new connection the device plans to use to the controller device so that the controller device knows the frequency band, channel, network, etc. to which to connect to maintain communication with the device.

At block 416, the processing circuitry of the device may establish a connection with the new AP using the connection which was identified as being better than the previous connection. To establish the connection, the device may request access to a network, band, and/or channel using one or more identifiers in a request. The AP may respond with a confirmation that the device has been accepted and is associated with the network on a particular channel.

At block 418, the processing circuitry of the device may receive streaming video using the existing connection or new connection if a new connection has been established.

Figure 5:
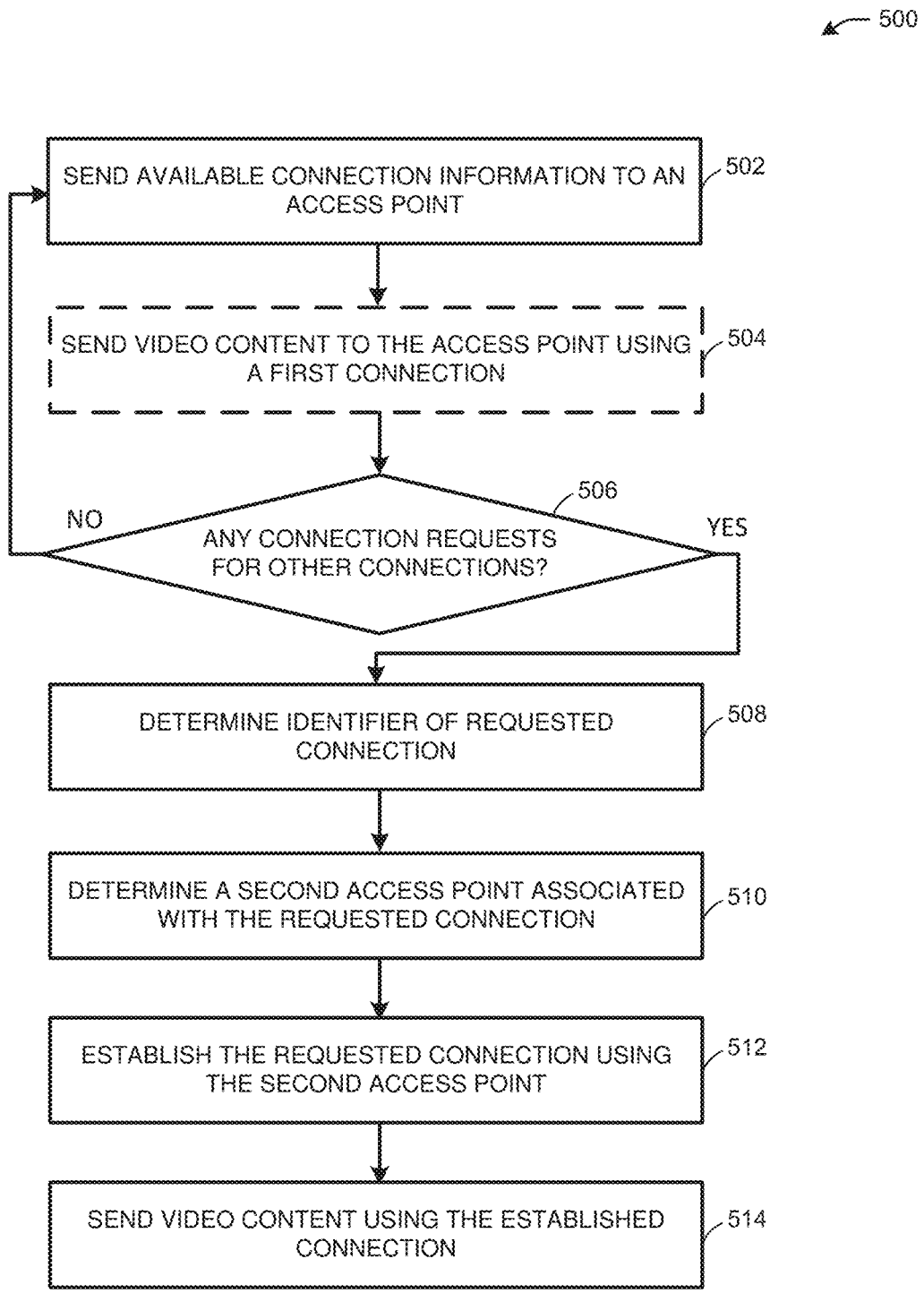
FIG. 5 illustrates a flow diagram for a process for establishing a network route for a streaming video device, in accordance with one or more example embodiments of the present disclosure.

FIG. 5 illustrates a flow diagram for a process 500 for establishing a network route for a streaming video device, in accordance with one or more example embodiments of the present disclosure.

At block 502, processing circuitry of a device, (e.g., the AP 120 of FIG. 1) may send information regarding available connections with one or more APs hosted by the device. For example, the device may be connected to an AP (e.g., AP 120 of FIG. 1), and the AP may be connected with one or more client devices (e.g., streaming video device 110A of FIG. 1). The APs of the device may send indications of signal strength, congestion, and throughput for channels in multiple frequency bands to the client device through the connected AP.

At block 504, the processing circuitry of the device may send video content to the AP using a first connection between the device and the AP. For example, a 2.4 GHz or 5 GHz frequency band may be used to send video content to the AP to be delivered to a client device connected to the AP. The device may include a DVR with stored video content for playback. Because the client device may connect directly to the AP rather than directly to the device, the device may provide the video content to the client device through a connection between the device and the AP.

At block 506, the processing circuitry of the device may determine whether there are any connection requests that have been received by any client devices. For example, the AP may send request frames to the device indicating client device requests to connect to a particular network. If the device receives a request indicating a network to join (e.g., identifiers of any networks, bands, etc.), the device may determine whether the requesting client device may join the requested network. If there are any requests to join a network provided by the device, the process 500 may continue at block 508, where the device may determine an identifier of a requested connection. The identifier may indicate the requested network. The device may determine whether the requesting client device may join the network. If so, the process 500 may continue at block 510 where the device may determine the access point associated with the requested connection. For example, the device may include multiple APs providing multiple networks using different frequency bands. The requested network may be provided by one of the APs, and if the device identifies the AP associated with a connection request, the process 500 may continue at block 512. If no connection requests are received at block 506, the device may continue at block 502 to send content using the existing connection with an AP. The device may check for available connection requests even when the device is not sending content to a particular device such as the AP.

At block 512, the processing circuitry of the device may establish the requested connection using the AP associated with the requested network connection. The device may determine the connection which was requested (e.g., based on an identifier and/or password included in the request). If the device receives a network connection request (e.g., an association request), the device may send a response (e.g., an association response) indicating that the client device may join the network. By establishing the direct network connection with the client device, the device may not need to use the AP to communicate with the client device, but may maintain a connection with the AP. Such may facilitate the client device's ability to switch between connections of the AP and of the device.

At block 514, the processing circuitry of the device may send video content using the established connection. If the device uses a 2.4 GHz connection to connect with the client device, the device may send the video content over the 2.4 GHz connection. If the device uses a 5 GHz connection to connect with the client device, the device may send the video content over the 5 GHz connection.

Figure 6:
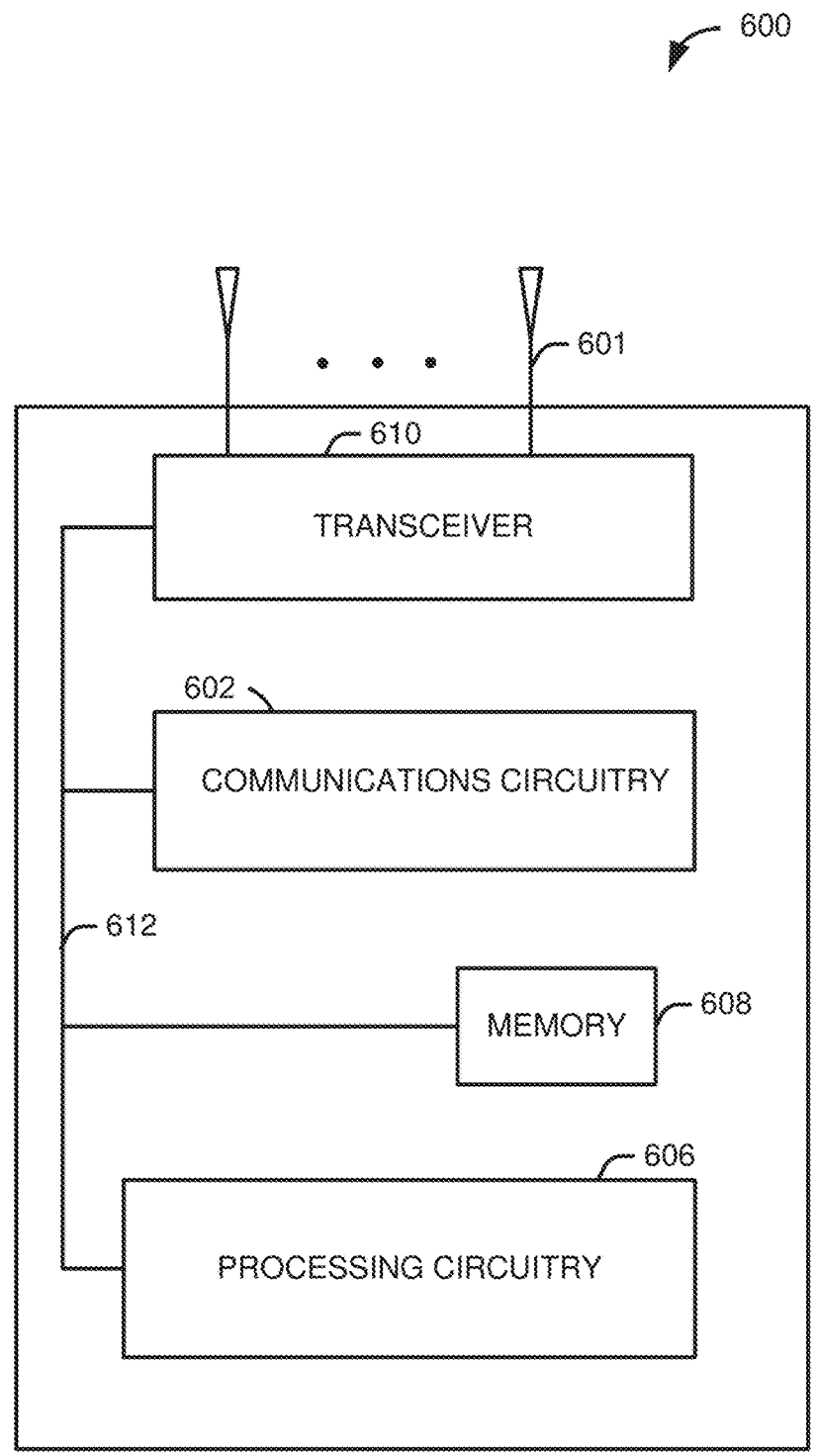
FIG. 6 shows a functional diagram of an exemplary wireless device, in accordance with one or more example embodiments of the present disclosure.

FIG. 6 illustrates a functional diagram of an exemplary wireless device that may be suitable for streaming video, in accordance with one or more example embodiments of the present disclosure.

FIG. 6 shows a functional diagram of an exemplary wireless device 600, in accordance with one or more example embodiments of the present disclosure. In one embodiment, FIG. 6 illustrates a functional block diagram of a wireless device that may be suitable for use as an AP 120 (FIG. 1) or a streaming video device 110A (FIG. 1) in accordance with some embodiments. The wireless device 600 may also be suitable for use as a handheld device, a mobile device, a cellular telephone, a smartphone, a tablet, a netbook, a wireless terminal, a laptop computer, a wearable computer device, and a device configured to provide streaming video to a display.

The wireless device 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The wireless device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the wireless device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the wireless device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a wearable computer device, or another device that may receive and/or transmit information wirelessly.

In some embodiments, the wireless device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the wireless device 600 may include or be operatively connected to one or more of a keyboard, a display, a non-volatile memory port, multiple antennas, a graphics processor, an application processor, speakers, and other mobile device elements. The display may be an LCD screen including a touch screen.

Although the wireless device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the wireless device 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the wireless device 600 may include one or more processors and may be configured with instructions stored on a computer-readable storage device.

The wireless device 600 may further include one or more buses 612 that functionally couple various components of the wireless device 600. The bus(es) 612 may include at least one of a system bus, a memory bus, an address bus, or a message bus, and may permit the exchange of information (e.g., data (including computer-executable code), signaling, etc.) between various components. The bus(es) 612 may include, without limitation, a memory bus or a memory controller, a peripheral bus, an accelerated graphics port, and so forth. The bus(es) 612 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

Figure 7:
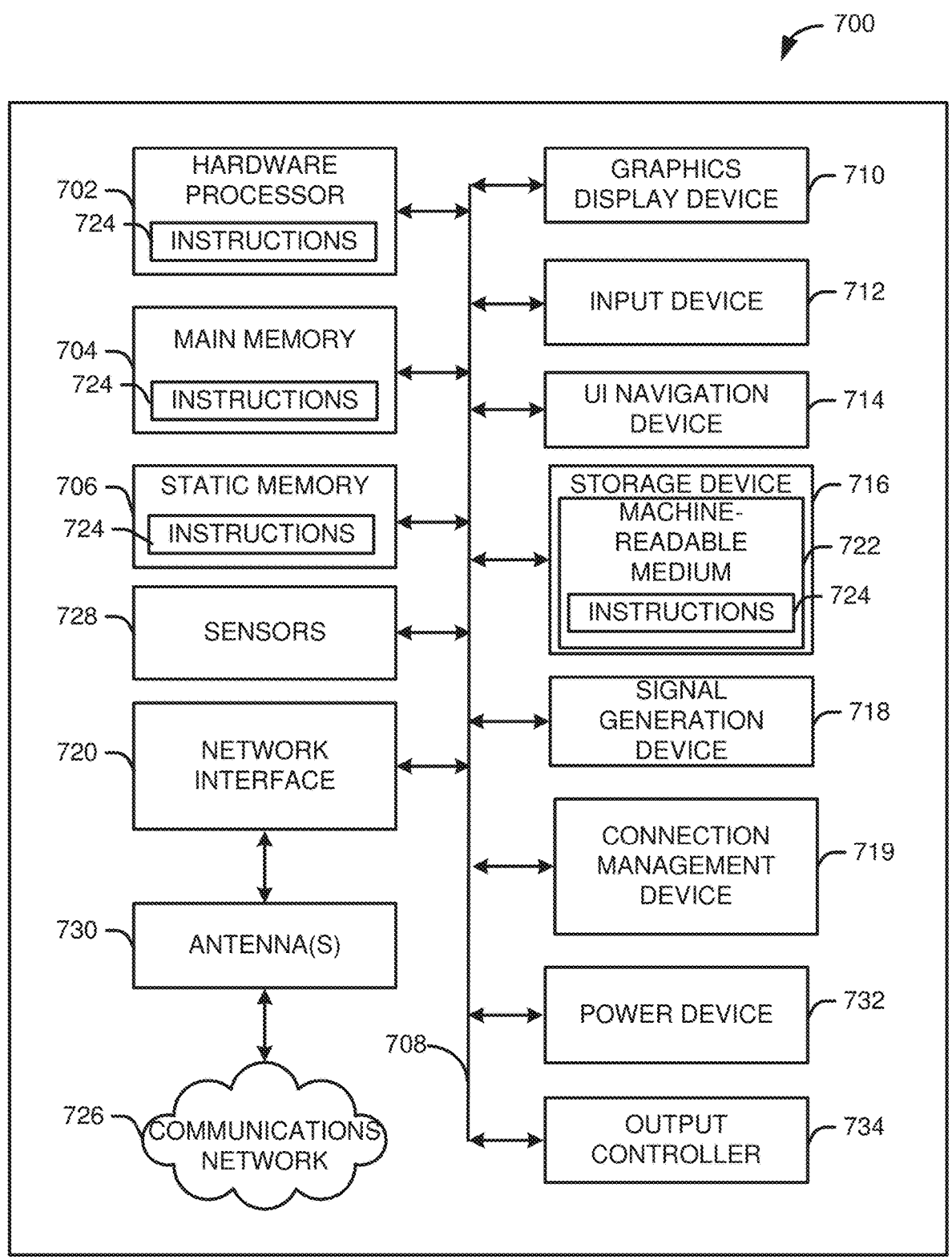
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the streaming video device 110A of FIG. 1) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 404 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a connection management device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 404, within the static memory 706, or within the hardware processor 702 during execution thereof by the machine 700. In an example, one or any combination of the hardware processor 702, the main memory 404, the static memory 706, or the storage device 716 may constitute machine-readable media.

The connection management device 719 may carry out or perform any of the operations and processes (e.g., process 200 of FIG. 2) described and shown above.

It is understood that the above are only a subset of what the connection management device 719 may be configured to perform and that other functions included throughout this disclosure may also be performed by the connection management device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
   receiving, by a first streaming video device, a first portion of digital video from a first access point (AP) using a first connection between the first streaming video device and the first AP, wherein the first connection uses a first frequency band;
   receiving, using the first connection, an identifier of a second frequency band associated with a second AP of a remote digital video recorder (DVR);
   determining a first connection quality associated with the first frequency band;
   determining that the first connection quality fails to satisfy a threshold;
   determining a second connection quality associated with the second frequency band;
   determining that the second connection quality satisfies the threshold;
   sending an indication to a remote control device that the first streaming video device intends to establish a second connection with the second AP using the second frequency band, wherein the remote control device is connected to the first streaming video device using a first Wi-Fi direct connection;
   establishing the second connection;
   establishing a second Wi-Fi direct connection with the remote control device using the second frequency band; and
   receiving a second portion of digital video using the second connection.

2. The method of claim 1, wherein the remote DVR includes a third AP, wherein the third AP uses a third frequency band, wherein the first frequency band has a first bandwidth, wherein the second frequency band has a second bandwidth, wherein the third frequency band has a third bandwidth, wherein the first bandwidth is the same as the second bandwidth, wherein the first bandwidth is different than the third bandwidth.

3. The method of claim 1, wherein the remote DVR includes a third AP, wherein the third AP uses a third frequency band, wherein the first frequency band has a first bandwidth, wherein the second frequency band has a second bandwidth, wherein the third frequency band has a third bandwidth, wherein the first bandwidth is different the second bandwidth, wherein the first bandwidth is the same as the third bandwidth.

4. The method of claim 1, wherein determining the first connection quality includes determining at least one of a signal strength, a throughput, or a congestion level.

5. The method of claim 1, wherein establishing the second connection includes sending a connection request to the remote DVR, the connection request indicating the identifier of the second frequency band.

6. A method comprising:
   determining, by a first wireless device, a first connection assessment value associated with a first wireless connection between the first wireless device and a first access point (AP), wherein the first wireless device is connected to a remote control device;
   receiving, at the first wireless device, from the first AP, connection data associated with a second wireless connection between the first AP and a second AP of a second wireless device, the second wireless device comprising a digital video recorder;
   determining, by the first wireless device, a second connection assessment value associated with the second AP based on the connection data;
   determining, by the first wireless device, to request a second wireless connection between the first wireless device and the second AP based on a comparison of the first connection assessment value to the second connection assessment value;
   sending, by the first wireless device, a request for the second wireless connection, the request sent using the first wireless connection;
   sending, by the first wireless device, an indication to the remote control device that the first wireless device will establish the second wireless connection; and
   receiving, at the first wireless device, digital content from the second wireless device using the second wireless connection.

7. The method of claim 6, further comprising receiving an identifier associated with the second AP, the identifier received on the first wireless connection, wherein the request for the second wireless connection includes the identifier.

8. The method of claim 6, wherein the first wireless device, the first AP, and the second wireless device share a network.

9. The method of claim 6, wherein the first wireless connection has a first frequency bandwidth, wherein the second wireless connection has a second frequency bandwidth, and wherein the first frequency bandwidth is the same as the second frequency bandwidth.

10. The method of claim 6, wherein the first wireless connection has a first frequency bandwidth, wherein the second wireless connection has a second frequency bandwidth, and wherein the first frequency bandwidth is different than the second frequency bandwidth.

11. The method of claim 6, wherein the second wireless device includes a third AP, wherein the second wireless connection has a first frequency bandwidth, wherein the third AP has a second frequency bandwidth, wherein the first frequency bandwidth is different than the second frequency bandwidth.

12. The method of claim 6, wherein determining the first connection assessment value includes determining a first signal strength associated with the first wireless connection, wherein the connection data indicates a second signal strength associated with the second AP, wherein determining to request the second wireless connection includes determining that the second signal strength is greater than the first signal strength.

13. The method of claim 6, wherein determining the first connection assessment value includes determining a first throughput associated with the first wireless connection, wherein the connection data indicates a second throughput associated with the second AP, wherein determining to request the second wireless connection includes determining that the second throughput is greater than the first throughput.

14. The method of claim 6, wherein determining the first connection assessment value includes determining a first congestion level associated with the first wireless connection, wherein the connection data indicates a second congestion level associated with the second AP, wherein determining to request the second wireless connection includes determining that the second congestion level is less than the first congestion level.

15. The method of claim 6, further comprising:
   determining that the remote control device is connected to the first wireless device using a first Wi-Fi direct connection; and
   establishing a second Wi-Fi connection with the remote control device using a frequency band associated with the second wireless connection.

16. The method of claim 6, wherein the request is a first request, further comprising:
   determining a third connection assessment value associated with the second wireless connection;
   receiving an indication of a fourth connection assessment value associated with the first wireless connection;
   determining that the fourth connection assessment value exceeds the third connection assessment value; and
   sending a second request for a third connection between the first wireless device and the first AP, the request sent using the second wireless connection.

17. The method of claim 6, wherein the request is a first request, wherein the digital content is first digital content, further comprising:
   receiving an indication to receive second digital content from a third wireless device, wherein the third wireless device is wirelessly connected to the first AP; and
   sending a second request for a third connection between the first wireless device and the first AP, the second request sent using the second wireless connection.

18. A device comprising storage coupled to one or more processors, the one or more processors configured to:
   send, using a first wireless connection between a first access point (AP) of the device and a second device, a first indication of a first connection assessment value associated with the first wireless connection and a second indication of a second connection assessment value associated with a second wireless connection between a second AP of the device and the second device, wherein the device further comprises a digital video recorder;
   receive, from a client device, an indication that the client device is using a third wireless connection between the client device and a remote control device, the indication received using the first wireless connection, and the indication associated with a comparison of the first connection assessment value to the second connection assessment value, the third wireless connection using a frequency band;
   establish a fourth wireless connection using the frequency band; and
   send digital content to the client device using the fourth wireless connection.

19. The device of claim 18, wherein the second wireless connection and the first wireless connection have a same bandwidth.

20. The device of claim 18, wherein the second wireless connection and the first wireless connection have different bandwidths.

* * * * *